United States Patent [19]

Shiba et al.

[11] 4,165,051

[45] Aug. 21, 1979

[54] TAPE REEL

[75] Inventors: Haruo Shiba; Masatoshi Okamura, both of Tokyo, Japan

[73] Assignee: TDK Electronics Co., Ltd., Tokyo, Japan

[21] Appl. No.: 924,359

[22] Filed: Jul. 13, 1978

[30] Foreign Application Priority Data

Jul. 14, 1977 [JP]  Japan ............................. 52-93532[U]

[51] Int. Cl.² ............................................. B63H 75/78
[52] U.S. Cl. .................................................. 242/74.1
[58] Field of Search ...................... 242/74, 74.1, 74.2

[56] References Cited

U.S. PATENT DOCUMENTS

| 1,578,231 | 3/1926 | Deses | 242/74.1 |
| 2,991,955 | 7/1961 | Post | 242/74 |
| 3,836,091 | 9/1974 | Hurtig | 242/74 |

Primary Examiner—Edward J. McCarthy
Attorney, Agent, or Firm—Oblon, Fisher, Spivak, McClelland & Maier

[57] ABSTRACT

A video cassette tape reel comprises at least one flange; a ring hub having a groove in parallel to the axis of the hub; a clamp fitted to the groove; and peripheral guides formed in the hub between which the clamp is fitted, whereby a tape clamped on the ring hub is not contacted with the flange in winding the tape.

6 Claims, 7 Drawing Figures

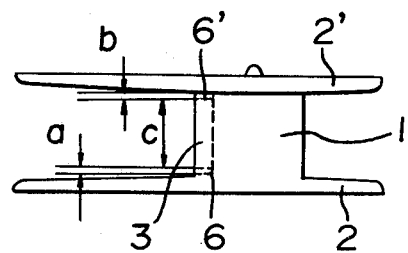
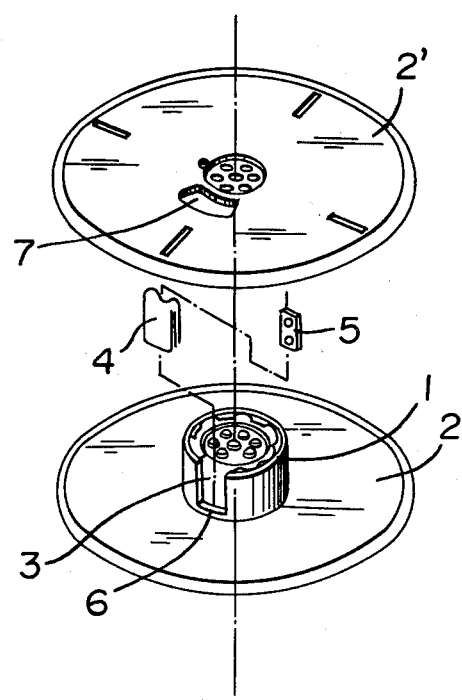
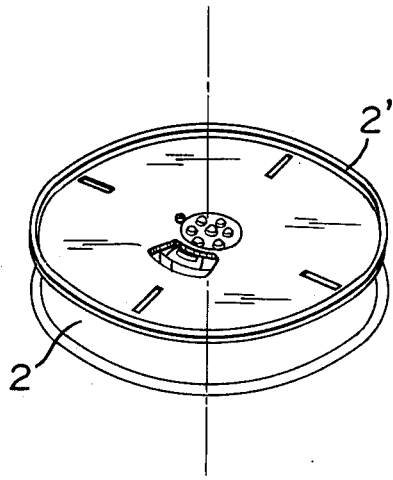

TAPE REEL

BACKGROUND OF THE INVENTION

1. Field of the Invention

The present invention relates to a tape reel on which a tape is wound without contacting with a flange.

2. DESCRIPTION OF THE PRIOR ART

A video cassette tape is usuaLly different from audio cassette tapes and a hub used for the video cassette tape has one or two flanges to have a structure similar to the structure of the conventional open reel.

One embodiment of the conventional video cassette tape reel is shown in FIGS. 1(a) and (b), wherein flanges (2), (2') are formed at both sides of a hub (1) and a groove (3) is formed on the cylindrical surface of the hub in parallel to the axis of the hub and a tape (not shown) is clamped by a clamp (4) fitted to the groove (3). The clamp (4) is held by inserting a stopper (5) into the clamp (4) whereby the disconnection of the clamp (4) is prevented by the stopper (5). An opening (7) is formed on the flange (2').

In the conventional video cassette tape reel, the groove (3) is formed along the full length of the cylindrical surface in parallel to the axis of the hub whereby the tape is not always clamped at the center of the groove (3). That is, there is a possibility that the tape is clamped due to certain deviation in the groove (3). When the tape is wound with the deviation in the groove (3), the side edge of the wound tape is contacted with the flange (2) to cause damage to the tape and to cause dropout thereof, disadvantageously.

SUMMARY OF THE INVENTION

It is an object of the present invention to provide a video cassette tape reel which does not have the above-mentioned disadvantage of contacting the side edge of the tape with the flange.

The foregoing object of the present invention has been attained by providing a video cassette tape reel which comprises at least one flange, a ring hub having a groove in parallel to the axis of the hub; a clamp fitting to the groove; and peripheral guides formed in the hub between which the clamp is fitted whereby a tape clamped on the ring hub is not contacted with the flange in winding the tape.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIGS. 1(a) and (b) are schematic views of one embodiment of the conventional video cassette tape reel, wherein FIG. 1(a) is a disassembled schematic view and FIG. 1(b) is an assembled schematic view;

FIGS. 2(a) and (b) are schematic views of one embodiment of the video cassette tape reel according to the present invention wherein FIG. 2(a) is a disassembled schematic view and FIG. 1(b) is an assembled schematic view;

FIG. 3 is a side view of the embodiment of FIG. 2; and

FIGS. 4(a) and (b) are schematic views of the other embodiment of the video cassette tape reel accoRding to the present invention.

DETAILED DESCRIPTION OF THE PREFERRED EMBODIMENTS

Figure 1A:
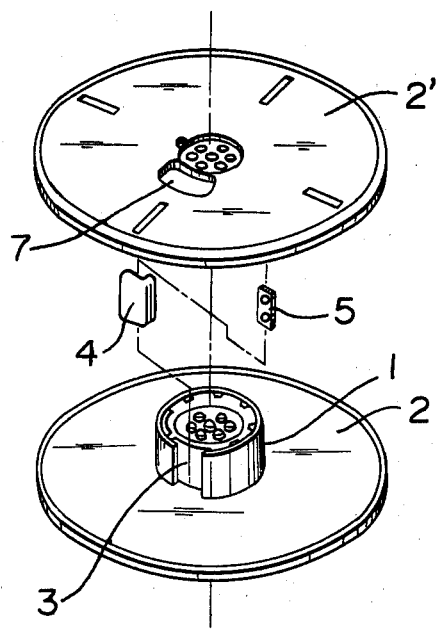
Figure 1B:
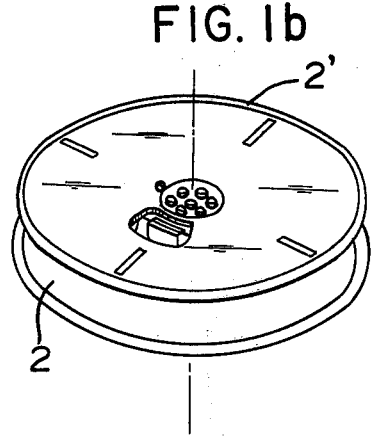
Figure 2A:
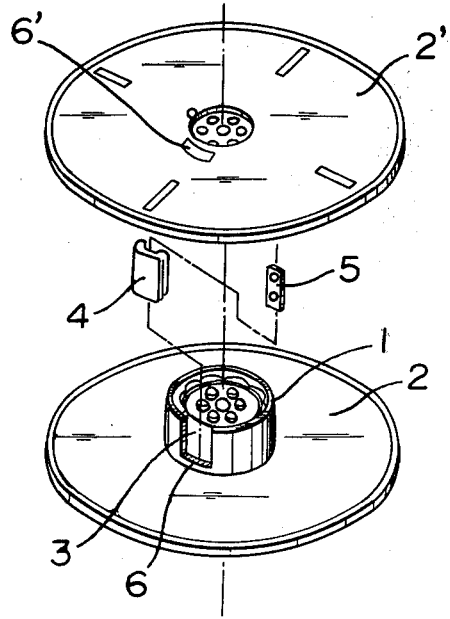
Figure 2B:
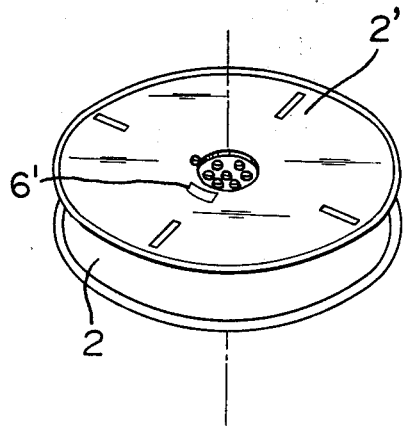

In FIGS. 2(a) and (b) the flanges (2), (2') are formed at both sides of the hub (1) and the groove (3) is formed on the cylindrical surface of the hub parallel to the axis of the hub and the tape (not shown) is clamped by the clamp (4) fitted to the groove (3). The clamp (4) is held by inserting a stopper (5) into the clamp (4) whereby the disconnection of the clamp (4) is prevented by the stopper (5).

A peripheral guide (6) is formed in the groove (3) at one side of the hub (1) and a peripheral guide (6') is formed on a flange (2'). The thickness of the peripheral guide (6) is designated "a" and the thickness the peripheral guide (6') is "b" whereby the tape having a width of "c" can be wound around the hub without contacting the side edge of the tape with the flange. Since only the peripheral guide (6) is formed in the groove (3) at one side of hub (1), the clamp (4) held the tape with the stopper (5) can be easily fitted to the grooVe (3) of the hub (1).

FIGS. 4(a) and (b) shows the other embodiment of the video cassette tape reel of the present invention wherein the opening (7) is formed on the flange (2') as that of the conventional reel. In this embodiment, both of the peripheral guides (6),(6') are formed in the groove (3) at both sides of the hub (1) and the tape is clamped with the clamp (4) by pushing the clamp (4) with the finger of the operator through the opening so as to fit the clamp (4) between the peripheral guides (6),(6') when the tape is clamped with the clamp.

The peripheral guide (6),(6') formed in the groove (3) can be of various forms so as to guide the tape without any deviation in winding the tape. The peripheral guides (6),(6') preferably formed with a curved surface to correspond with the cylindrical surface of the hub, however, such can be further projected from the cylindrical surface of the hub so as to guide the tape. The peripheral guides can be also extended over the groove and the cylindrical surface of the hub so as to guide the tape.

At the centers of the hub at both sides, there are provided holes or projections for fitting to projections or holes on a reel holder or a reel driving device (not shown).

In accordance with the present invention, the side edge of the tape wound in the video cassette tape reel is not contacted with the flange of the reel so as to prevent the damage of the tape and the of the tape in winding the tape on The reel.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A video cassette tape reel which comprises at least one flange; a ring hub having a groove in parallel to an axis of the hub; a clamp fitted to the groove; and peripheral guides formed in said hub between which said clamp is fitted, whereby a tape clamped on the ring hub is not contacted with the flange in winding the tape.

2. A video cassette tape reel according to claim 1 wherein a first peripheral guide of said peripheral guides is formed in the groove at one side of the hub and a second peripheral guide is formed on the flange at the part thereof corresponding to the groove.

3. A video cassette tape reel according to claim 1 wherein said peripheral guides comprise a first and second peripheral guide formed in the groove at both sides of the hub.

4. A video cassette tape reel according to claim 1 wherein said flange includes an opening formed therein above the groove of the hub.

5. A video cassette tape reel according to claim 1 which further comprises a stopper wherein the clamp is assembled with said stopper for clamping the tape and the clamp is fitted in the groove.

6. A video cassette tape reel according to claim 1 wherein the peripheral guides are projected over the groove.

* * * * *